Oct. 27, 1936.  O. B. ALLRED  2,059,078
TANK CAR VALVE
Filed July 8, 1935  2 Sheets-Sheet 1

INVENTOR.
Otis B. Allred
BY Van Buren Hillyard.
ATTORNEY.

Oct. 27, 1936.    O. B. ALLRED    2,059,078
TANK CAR VALVE
Filed July 8, 1935    2 Sheets-Sheet 2

INVENTOR.
Otis B. Allred
BY Van Buren Hillyard.
ATTORNEY.

Patented Oct. 27, 1936

2,059,078

UNITED STATES PATENT OFFICE 2,059,078

TANK CAR VALVE

Otis B. Allred, Wichita Falls, Tex., assignor of one-fourth to Robert D. McIver, Wichita Falls, Tex.

Application July 8, 1935, Serial No. 30,373

1 Claim. (Cl. 137—21)

The invention provides a valve designed more especially for tanks that are mounted upon trucks for transportation over railroads and aims to minimize the hazard to human life, both in the installation and the testing of the valve.

The invention furthermore provides a valve of the character indicated which may be tested separate and apart from the tank and with little or no appreciable waste of fluid.

The invention also contemplates a valve having a dual sealing, the closing elements being synchronously operable by means of a right and a left threaded stem which is mounted for a limited endwise play to insure a uniform seating of both closing elements.

The invention supplies a valve of the character aforesaid which may be installed from without the tank, thus avoiding the necessity for one to enter the tank and obviating the risk incident to such step.

While the drawings illustrate a preferred embodiment of the invention, it is to be understood that in adapting the same to meet specific needs and requirements, the design may be varied and changes in the minor details of construction may be resorted to within the scope of the invention as claimed, without departing from the spirit thereof.

For a full understanding of the invention and the merits thereof, reference is to be had to the following description and the drawings hereto attached, in which.

Corresponding and like parts are referred to in the following description and designated in the several views of the drawings by like reference characters.

Figure 1:
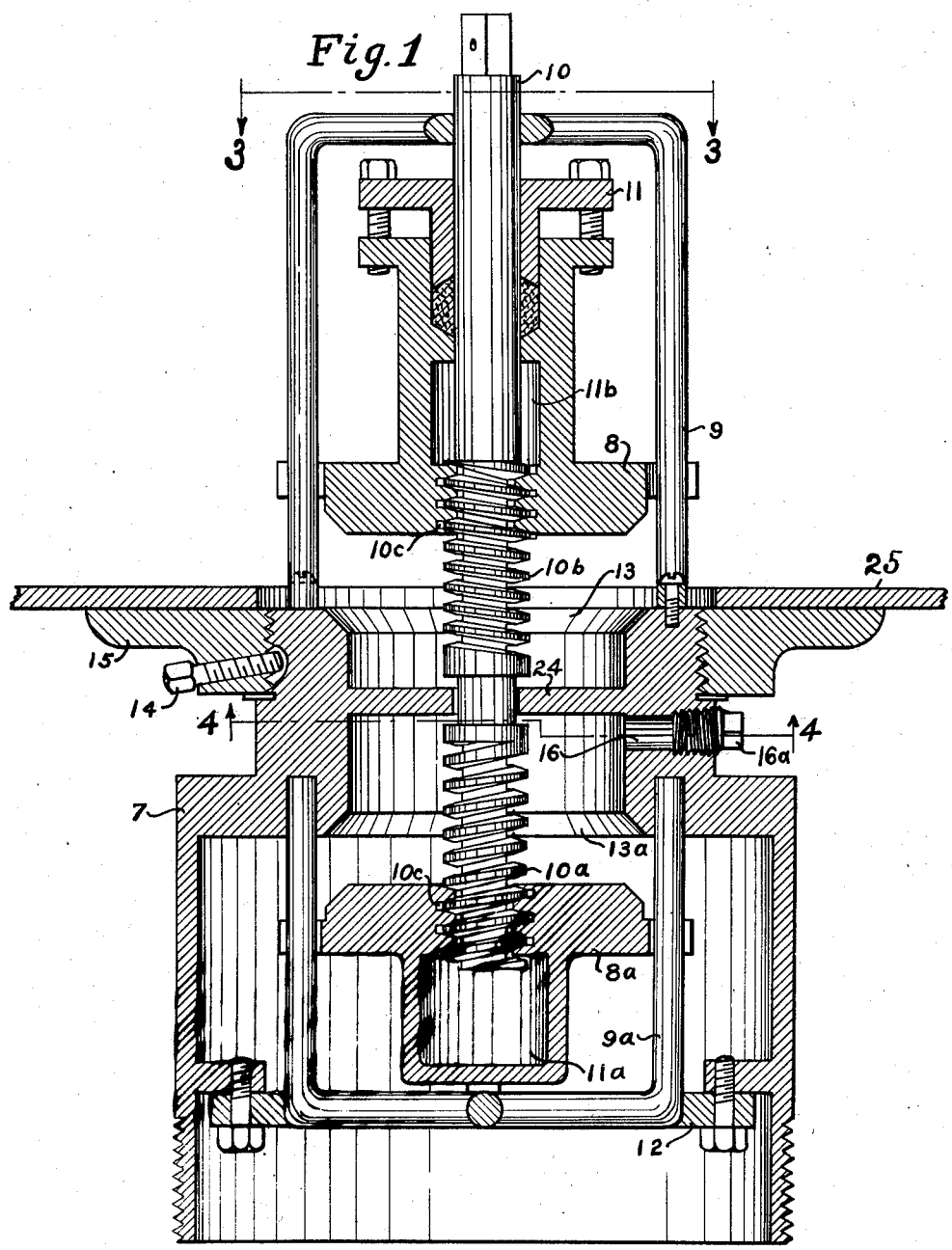
Figure 1 is an enlarged sectional detail view of a tank valve embodying the invention, the closing elements being unseated.
Figure 2:
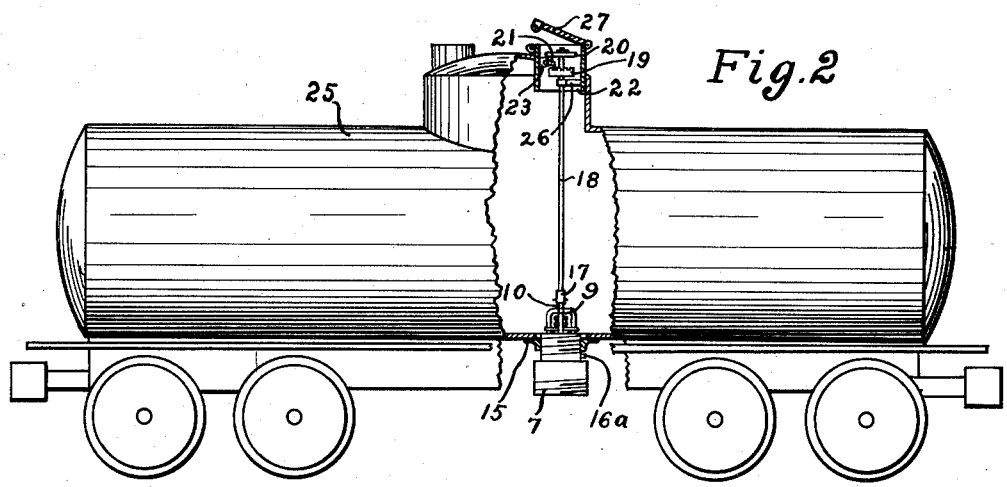
Figure 2 is a side view of a tank car equipped with the improved valve, a portion being broken away to disclose the valve and adjunctive parts.
Figure 3:
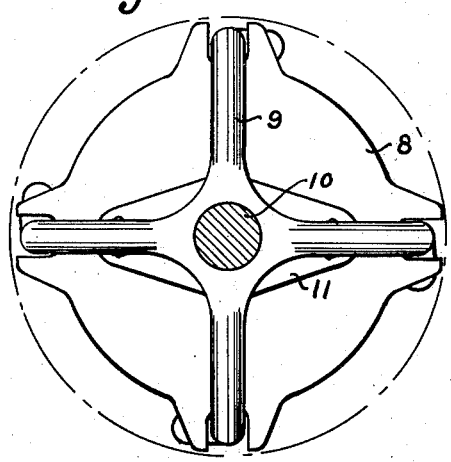
Figure 3 is a sectional view on the line 3—3 of Figure 1.
Figure 4:
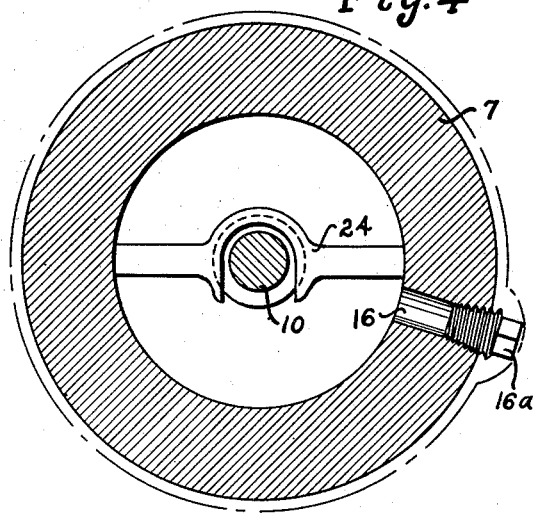
Figure 4 is a sectional view on the line 4—4 of Figure 1.
Figure 5:
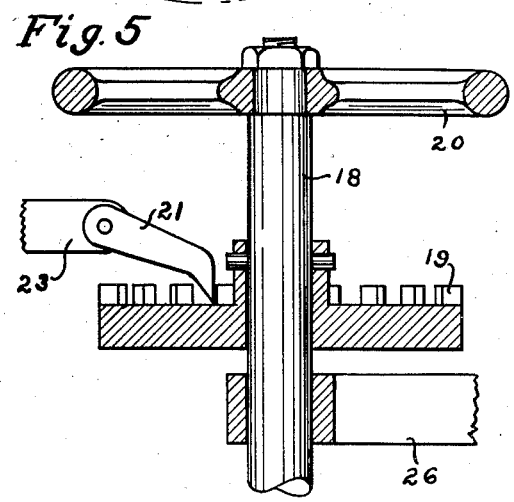
Figure 5 is an enlarged sectional detail of the parts associated with the upper portion of the valve operating stem.
Figure 6:
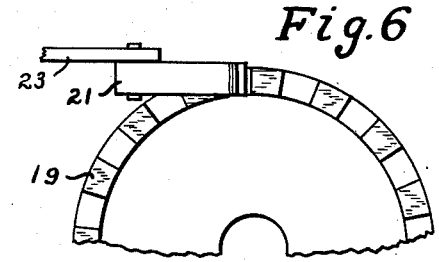
Figure 6 is a detail view of a portion of the sprocket wheel and coacting pawl forming the valve locking means.

In the preferred construction, the valve body comprises an upper portion 7 and a lower portion 7a. Seats 13 and 13a are provided at the ends of the portion 7. Elements 8 and 8a close on the seats 13 and 13a and constitute valve discs which are centrally threaded to match right and left threaded portions 10a and 10b of a stem 10. The valve 8a is formed with a chambered portion 11a in which is received the lower end of the stem 10. A smaller chambered portion 11b is formed on the valve 8 and the stem 10 passes therethrough. A gland 11 confines packing in a recess formed in the upper end of the projection 11b. The valves 8 and 8a are prevented from turning; hence, rotation of the stem 10 effects a movement of the respective valves towards or away from the seats 13 and 13a. A cage 9 secured to the upper reduced end of the valve body provides a guide for the valve 8 and a bearing for the valve stem 10. A similar cage 9a within the lower portion 7a of the valve body guides the valve 8a and prevents its turning. A chamber 30 is formed in the part 7 of the valve body between the valve seats 13 and 13a. A bar 24 extending across the chamber 30 engages the valve stem 10 between the threaded portions thereof and limits the play of said stem and affords uniform seating of the valves 8 and 8a. An opening 16 in a side of the part 7 is closed by a plug 16a and facilitates tests.

A plate 15 is applied to the bottom of the tank 25 in line with the opening formed therein and receives the valve which is threaded thereto. A binding screw 14 threaded into the plate 15 secures the valve. The valve is applied to the tank 25 from the outside, hence the necessity for entering the car is obviated and the usual risk avoided. An opening 10c is formed in each of the valves 8 and 8a for the escape of liquid that may find its way into the chambers 11a and 11b. This opening is coincident with the thread receiving the valve stem and is formed by extending the thread beyond the threaded portion of the valve stem.

An operating stem 18 is coupled to the valve stem 10 and is mounted in a bracket 26 within the dome of the tank 25. A hand wheel 20 is fitted to the stem 18. A sprocket wheel 19 is pinned or otherwise secured to the stem 18, and a pawl 21 coacts therewith to hold the stem 18 against backward movement. The sprocket wheel 19 and pawl 21 constitute locking means for the valve to prevent opening thereof by vibration. A bracket 23 pivotally supports the pawl 21.

The construction admits of testing the valve for leakage before or after installation. The two valves 8 and 8a provide a double sealing against possible leak. The right and left screw thread connection of the valves 8 and 8a with the stem 10 results in a synchronous seating or unseating thereof upon rotation of the stem. An even and uniform seating of the valves is assured by the endwise play of the stem 10.

Having thus described the invention, what I claim is:

A tank valve of the character specified comprising a body having an end portion reduced and chambered, and provided with seats at the ends of the chamber and having a test outlet leading from the chamber, a manually operable closure for the test outlet, a bar extending across the chamber, valves closable on said seats and adapted to confine any fluid entrapped in said chamber, cages projecting from opposite ends of the chambered portion of the body and engaging the valves to form guides therefor and prevent their turning, and a right and left threaded stem mounted in one of the cages and engaging the valves to effect a simultaneous seating and unseating thereof, and having the right and left threaded portions spaced apart to receive the aforesaid bar and coact therewith to limit endwise play of the stem.

OTIS B. ALLRED.